Patented July 20, 1954

2,684,380

UNITED STATES PATENT OFFICE 2,684,380

PRODUCTION OF SULFITE ESTERS

Alphonse Pechukas, Pittsfield, Mass., assignor to Columbia-Southern Chemical Corporation No Drawing. Application November 20, 1951,
Serial No. 257,440

12 Claims. (Cl. 260—456)

This invention is directed to a novel series of sulfite esters having unusual stability and having other valuable properties. According to the present invention, the novel isomers, bis(2-chloro-3-alkoxypropyl) sulfite, bis(1-chloromethyl-2-alkoxyethyl) sulfite, and 2-chloro-3-alkoxypropyl,1'-chloromethyl-2'-alkoxyethyl sulfite, have been prepared. These compounds may be prepared by reacting an ether of glycidol with thionyl chloride, usually at a low temperature, for example, at 0° to 20° C. The reaction proceeds in accordance with the following equation:

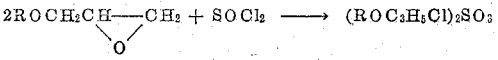

The resulting product is a mixture of the isomers having the following structural formulae:

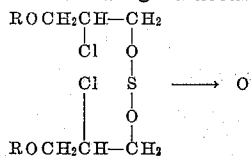

and

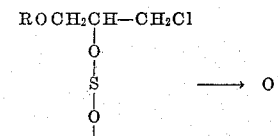

and

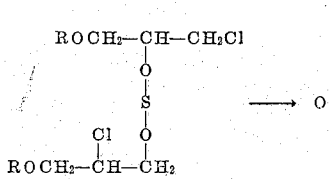

Thus, it will be seen that the compounds obtained are sulfite esters of one of the ether alcohols:

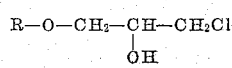

and

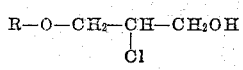

in which both acid groups of sulfurous acid are esterified with the ether alcohol.

In general, the compounds are prepared by cooling a pool of thionyl chloride and adding the glycidol ether to the pool while cooling the reaction mixture. Inert solvents may be present, if desired, but are usually unnecessary. After addition is complete and heat developed during addition largely dissipated, the reaction mixture is allowed to stand and frequently may be moderately heated to drive the reaction to a further degree of completion. Thereafter, the reaction mixture is heated to drive off impurities. Because of their high boiling points, the liquids do not readily distill.

The glycidol ethers which are used in accordance with this invention may be prepared by reacting an alcohol with epichlorohydrin, usually in an acid medium, whereby to form the chlorohydrin ether of the corresponding alcohol:

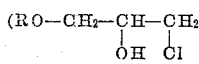

and

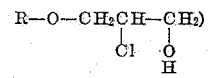

This chlorohydrin is converted to the corresponding glycidol ether by treatment with sodium hydroxide.

Various ethers of glycidol, having the structure

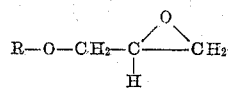

may be subjected to treatment according to this invention. Thus, glycidol ethyl ether, glycidol n-propyl ether, glycidol methyl ether, glycidol allyl ether, glycidol methallyl ether, glycidol 2-chloroallyl ether, glycidol 2-chloroethyl ether, glycidol phenyl ether, glycidol cyclohexyl ether, or glycidol 2-chlorophenyl ether may be subjected to treatment according to the present invention. Consequently, the radicals "R" in the above identified equation may be aliphatic, aromatic or cycloaliphatic hydrocarbon or halogenated hydrocarbon, particularly chlorinated hydrocarbon, containing up to about 6 carbon atoms. The radical "R" may be either saturated or unsaturated.

The following examples are illustrative:

Example I

Eleven and four-tenths grams of purified thionyl chloride was placed in a 100-milliliter, three-necked flask equipped with a mechanical stirrer, a thermometer, a dropping funnel, and a calcium chloride drying tube. This thionyl chloride was cooled to a temperature of 4 to 6° C., and, over a period of 1 hour, 25.5 grams of the allyl ether of glycidol was added. The reaction was exothermic and when, at the end of the epoxide addition, the ice bath was removed, the temperature rose rapidly. When the internal temperature reached 35° C., the ice bath was restored and the temperature of the reaction mixture was maintained for 2 hours at 15 to 20° C. During the addition of the epoxide and the subsequent 2-hour period, the reaction mixture was stirred. Thereafter, the mixture was heated under nitrogen at 35 millimeters absolute pressure for 1 hour at 120° C. The resulting product is a mixture of bis(2-chloro-3-alloxypropyl) sulfite and bis(1-chloromethyl-2-alloxyethyl) sulfite and 2 - chloro - 3 - alloxypropyl - 1' - chloromethyl-2'-alloxyethyl sulfite. These compounds have the respective structures:

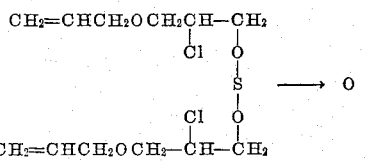

and

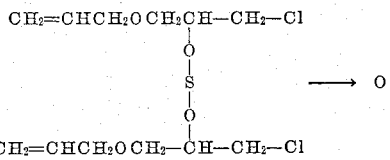

and

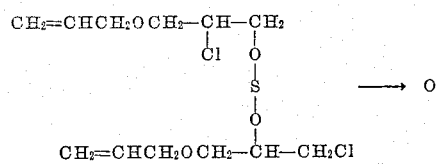

The refractive index of the product was $n_D^{20}$ 1.4809, and the density $(d_{20}^{20})1.208$ The glycidol allyl ether may be prepared by first preparing 1-alloxy-2-hydroxy-3-chloropropane according to the method of Swern, Billen, and Knight, Journal of American Chemical Society, volume 71, page 1152 (1949). The allyl ether of glycidol may be obtained from this compound according to the method of Flores-Gallardo and Pollard, Journal of Organic Chemistry, volume 13, page 831 (1947). In a test of the Swern, Billen, and Knight method, using 17.2 moles of allyl alcohol, 1.59 grams of sulphuric acid, and 1.72 moles of epichlorohydrin, and using sodium hydroxide to neutralize the acid, a suitable yield of the 1-alloxy-2-hydroxy-3-chloropropane was obtained.

These sulfites of glycidol allyl ether have surprising stability. They do not even discolor when heated. The corresponding sulfites of crotyl, methallyl or vinyl ethers may be prepared in the same way.

*Example II*

Seventy-eight and five-tenths grams of thionyl chloride, which had been distilled over sulfur, was placed in a 500-milliliter, three-necked flask equipped with a mechanical stirrer, thermometer, dropping funnel, and a calcium chloride drying tube. This thionyl chloride was cooled to 4° C., and 133.8 grams of glycidyl ethyl ether was added dropwise over a period of 1.25 hours while maintaining the reaction temperature at 2° to 6° C. Thereafter, the ice bath which cooled the reactor was removed, and the mixture was stirred for 2.5 hours until room temperature was attained. The mixture was heated at a pressure of 35 millimeters absolute pressure under nitrogen at a temperature up to 120° C. The refractive index $(n_D^{20})$ of the product was 1.4674. The glycidyl ethyl ether may be prepared according to the Flores-Gallardo and Pollard method described in the above cited article, from the first formed 1-ethoxy-2-hydroxy-3-chloropropane. The latter compound may be prepared using 6 moles of ethanol, 6.7 milliliters of sulphuric acid, and 3 moles of epichlorohydrin.

It will be understood that the sulfites of various other glycidol ethers may be prepared in the same manner. For example, the following ethers may be substituted in the above examples:

2-chlorophenyl glycidol ether
2,4-dichlorophenyl glycidol ether
2,4,5-trichlorophenyl glycidol ether as well as the other ethers listed above.

The resulting esters are normally liquids. These liquids have appreciable stability when compared with the stability of other sulfite esters. This is particularly true of the ethylenically unsaturated esters, i. e., esters of ethers in which the radical "R" is ethylenically unsaturated. In general, these compounds are probably mixtures of the several isomers set forth above. Because of the high boiling point of these compounds, separation of the isomers sometimes is difficult. Consequently, the compounds frequently are used as a mixture of isomers. If desired, the pure isomers may be prepared by the treatment of the corresponding hydroxy-chloroether with thionyl chloride. Thus, the sulfite ester,

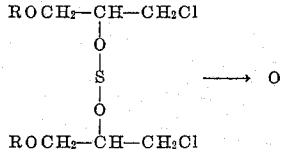

may be prepared by adding thionyl chloride to a mixture of 3-chloropropane,

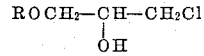

or 1-alkoxy-2-chloro-3-hydroxy propane, and an equimolar quantity of a suitable base, such as pyridine, usually with cooling.

These novel compounds may be used as insecticides, as organic solvents, and also as plasticizers for various different types of synthetic resins and plastics.

Although the present invention has been described with reference to the specific details of certain embodiments thereof, it is not intended that such details shall be regarded as limitations upon the scope of the invention except insofar as included in the accompanying claims.

This application is a continuation-in-part of my application Serial No. 719,929, filed January 2, 1947, now U. S. Patent No. 2,576,138.

What is claimed:

1. A sulfite diester of an ether alcohol of the group consisting of

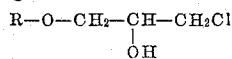

and

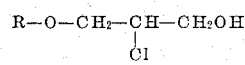

wherein R is a member of the group consisting of monovalent hydrocarbon and halogen substituted hydrocarbon radicals containing up to 6 carbon atoms.

2. A mixture of bis(2-chloro-3-alkoxypropyl) sulfite, bis(1-chloromethyl-2-alkoxyethyl) sulfite, and 2-chloro-3-alkoxypropyl-1'-chloromethyl-2'-alkoxyethyl sulfite, wherein the alkoxy group contains up to 6 carbon atoms.

3. Bis(2-chloro-3-alkoxypropyl) sulfite, wherein the alkoxy group contains up to 6 carbon atoms.

4. Bis(1-chloromethyl-2-alkoxyethyl) sulfite, wherein the alkoxy group contains up to 6 carbon atoms.

5. 2 - chloro - 3 - alkoxypropyl - 1' - chloromethyl-2'-alkoxyethyl sulfite, wherein the alkoxy group contains up to 6 carbon atoms.

6. A mixture of bis(2-chloro-3-ethoxypropyl) sulfite, bis(1-chloromethyl-2-ethoxyethyl) sulfite, and 2 - chloro - 3 - ethoxypropyl - 1' - chloromethyl-2'-ethoxyethyl sulfite.

7. A mixture of bis(2-chloro-3-alloxypropyl) sulfite, bis(1-chloromethyl-2-alloxyethyl) sulfite, and 2-chloro-3-alloxypropyl-1'-chloromethyl-2'-alloxyethyl sulfite.

8. Bis(2-chloro-3-ethoxypropyl) sulfite.

9. Bis(1-chloromethyl-2-ethoxyethyl) sulfite.

10. 2 - chloro - 3 - ethoxypropyl - 1' - chloromethyl-2'-ethoxyethyl sulfite.

11. Bis(2-chloro-3-alloxypropyl) sulfite.

12. Bis(1-chloromethyl-2-alloxyethyl) sulfite.

References Cited in the file of this patent

UNITED STATES PATENTS

| Number | Name | Date |
|---|---|---|
| 2,529,493 | Harris | Nov. 14, 1950 |
| 2,576,138 | Pechukas | Nov. 27, 1951 |

OTHER REFERENCES

Chemical Abstracts, vol. 44, col. 9113b, October 10, 1950, abstracting Armstrong, Can. Entomol., vol. 82, pages 73–83 (1950).